Patented Feb. 20, 1940

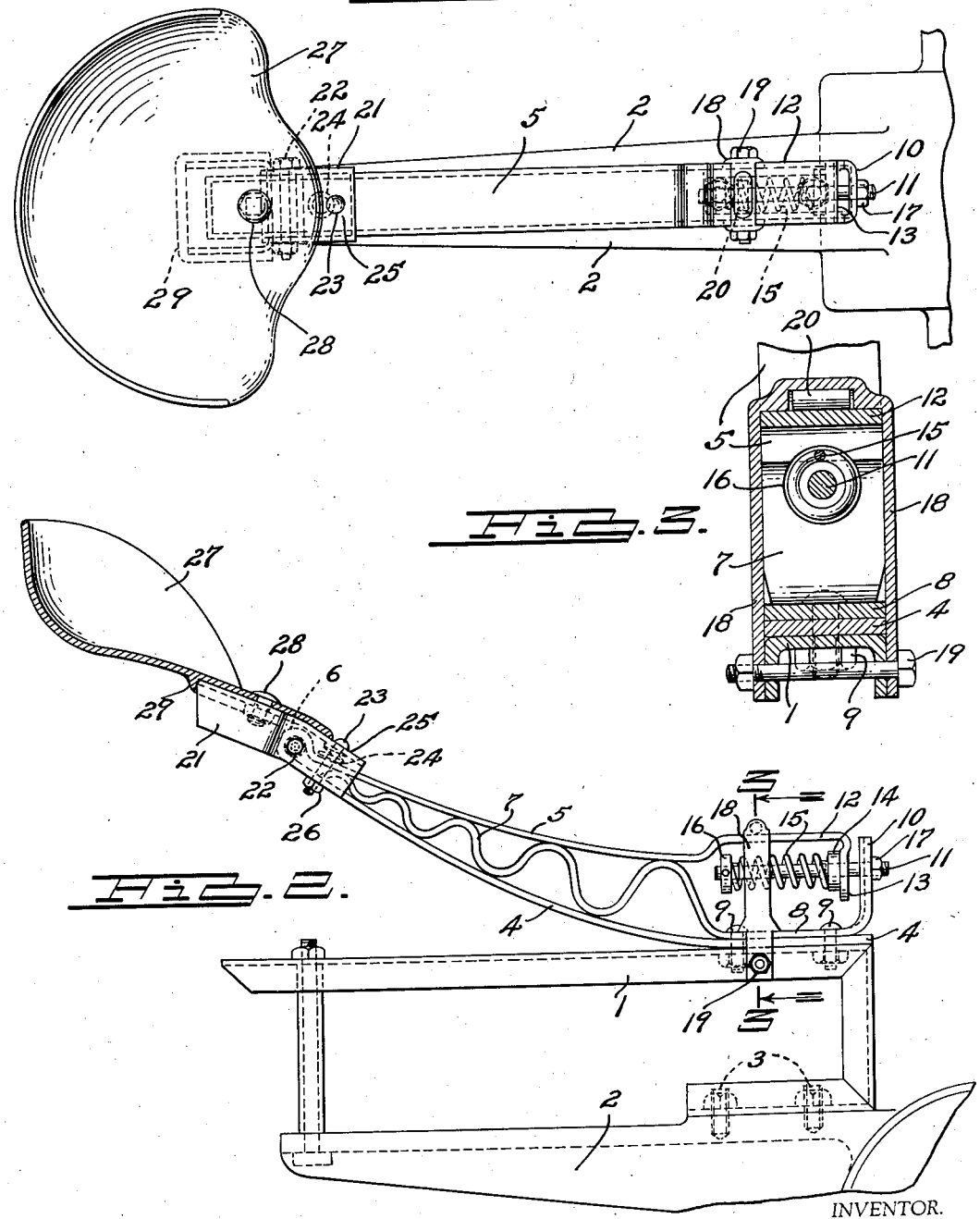

2,191,317

UNITED STATES PATENT OFFICE 2,191,317

SPRING SEAT

Walter Howard, Detroit, Mich.

Application December 8, 1938, Serial No. 244,637

4 Claims. (Cl. 155—51)

This invention relates to spring seats and the object of the invention is to provide a spring seat for tractors, farm implements and similar devices in which it is desired to provide a spring seat for the operator.

One of the particular objects of the invention is to provide a spring seat made entirely of metal and arranged so that the seat may be adjusted to accommodate persons of different weight.

Another object of the invention is to provide a spring seat comprising a yieldable supporting arm secured to the tractor or farm implement and a seat mounted on the end of the yieldable supporting arm, the seat being adjustable in position on the end of the supporting arm.

A further object of the invention is to provide a supporting arm comprising compression and tension members in which the tension member is spring supported so that downward movement of the seat tends to compress the spring.

Another object of the invention is to provide a support arrangement for the tension member in which the movement of the tension member is limited or controlled by a roller which allows longitudinal movement of the tension member in compressing the spring.

A further object of the invention is to provide a plicate spring between the compression and tension members arranged to strengthen the support and, at the same time, allow yielding movement thereof.

These objects and the several novel features of the invention are hereinafter more fully described and claimed and the preferred form of construction by which these objects are attained is shown in the accompanying drawing in which—

Fig. 1 is a plan view of a spring seat embodying my invention.

Fig. 2 is a side elevation thereof with the seat in section.

Fig. 3 is an enlarged section taken on line 3—3 of Fig. 2.

As shown in Fig. 2, a support 1 is provided which may be bolted direct to a tractor gear case or other farm implement support by means of the studs 3. Secured to the support 1 is a curved member 4 provided with a return bent portion 5 and having an eye 6 at the return bend. Between the portions 4 and 5 is a corrugated or plicate spring 7. This spring 7 is provided with a flat portion 8 shown at the right end of Fig. 2 and bolts 9 are inserted through this flat portion and through the end of the arm 4 and support 1 so that the portions 4 and 8 are firmly bolted to the support 1 which, in this case, is shown as being formed of channel iron. The portion 8 of the plicate spring terminates in a stiff upwardly extending end 10 which carries a bolt 11. This upwardly extending end 10 is stiffened by inturning the edges thereof as shown in plan in Fig. 1.

The return bent portion 5 is provided with a flat portion 12 terminating in a depending end 13 through which the bolt 11 extends. Secured to the depending end 13 is a cup 14 in which a spring 15 seats and a collar 16 is secured to the end of the bolt 11 so that the spring 15 is compressed between the collar 16 and cup 14. The tension of this spring 15 may be adjusted by turning up the nut 17 on the bolt 11.

A U-shaped bracket 18 is secured to the support 1 by means of a bolt 19 which extends through the sides of the support 1 as shown in Fig. 3. This U-shaped member 18 is provided with a cyanide steel roller 20 carried in the top which rolls on the portion 12 of the return bent arm 5. This acts as a guide for the portion 12 in its movement longitudinally of the bolt 11. In order to prevent the bracket 18 from rocking on the bolt 19 the bracket is provided with inturned lugs on the opposite sides engaging over the portion 8 of the spring 7 as shown in Figs. 2 and 3.

At the opposite end of the return bent portion 5 is a seat bracket 21 which is open at the bottom and carries a bolt 22 extending through the eye 6 at the return bend of the portions 4 and 5. This pivotally supports the seat bracket 21 and a bolt 23 is inserted through the top 25 of the seat bracket 21 and through the arms 4 and 5 as shown in Fig. 2. A coiled spring 24 is positioned between the top 25 of the seat bracket and the arm 5 so that as the nut 26 is tightened the spring is compressed between the top 25 of the seat bracket and the arm 5. This bolt adjusts the seat bracket 21 on the pivot 22 to the desired angular position. The seat 27 is formed of metal and is secured to the seat bracket by means of a bolt 28 and the seat is provided with a shoulder 29 engaging against the bracket 21 to prevent twisting movement of the seat on the seat bracket.

When the operator sits on the seat 27, his weight will force the seat downwardly thus placing the arm 4 under compression and placing the arm 5 under tension. In this respect, it will be noted that the plicate spring 7 yieldably resists this downward movement in combination with the arms 4 and 5. As the seat moves down, the arm 5 is placed under tension tending to pull the arm to the left of Fig. 2 thus moving the end 13 of the arm 5 to the left against the tension of the spring 15 which yieldably resists such movement of the arm 5. As the seat springs up and down in going over the rough ground the end 13 will move back and forth longitudinally of the bolt 11 thus acting directly against the spring 15. Upon removal of the weight from the seat the arms 4 and 5 and plicate spring 7 tend to return to the original position due to the resiliency of the metal and the spring 15 pushing the arm end 13 to the right of Fig. 2 assists in returning the parts to the original position. By adjustment of the nut 26 the angular position of the seat may be varied as desired to accommodate persons of greater or less weight and the device may be attached to a tractor, farm implement or any other device in which it is desired to provide a seat of this type. The device thus consists of a compression arm 4 and a tension arm 5 on opposite sides of a plicate spring 7 and the tension arm 5 is yieldably cushioned by means of the coiled spring 15. By adjusting the bolt 11 by the nut 17, the tension of the spring 15 may be adjusted to accommodate persons of different weight and by means of the nut 26 the seat may be adjusted on the pivot 22 to the desired angularity.

If it is desired to strengthen the spring action of the device, additional spring leaves may be provided beneath the member 4 and secured to the support 1.

From the foregoing description it becomes evident that the device is very simple and efficient in operation, is adjustable for persons of different weight, will yieldably support a person on the seat and provides a device which accomplishes the objects described.

Having thus fully described my invention, its utility and mode of operation, what I claim and desire to secure by Letters Patent of the United States is—

1. A spring seat comprising a spring metal member return bent to form compression and tension arms, a seat adjustably secured to said member at the return bend, a support, a plicate spring extending between the arms, the plicate spring and compression arm being secured to the support at the end opposite the seat, a bolt mounting extending upwardly from the support, a bolt adjustable longitudinally in the mounting, the tension arm being provided with a depending end through which the bolt extends, a coil spring between the depending end of the tension arm and the end of the bolt, the arrangement being such that as weight is applied to the seat the coil spring is placed under compression, a bracket secured to the support and extending over the end of the tension arm, a roller carried in the bracket and riding in engagement with the end of the tension arm and means for adjusting the bolt in the mounting to vary the tension of the coil spring.

2. A spring seat comprising a spring metal member return bent to form compression and tension arms, a seat pivotally secured to said member at the return bend, means for adjusting the seat on its pivot, a support, a plicate spring extending between the arms, the plicate spring and compression arm being secured to the support at the end opposite the seat, the plicate spring being provided with an upwardly extending stiffened end adjacent the support, a bolt adjustably mounted in said upturned end, a coil spring carried by the bolt, the tension arm being provided with a depending end provided with an aperture through which the bolt extends, the arrangement being such that depression of the seat will move the depending end of the tension arm to compress the coil spring and guide means for the end of the tension arm.

3. A spring seat comprising a spring metal member bent upon itself to form compression and tension arms, a seat secured to the said member at the return bend, a plicate spring extending between the arms, the plicate spring and compression arm being stationarily secured in position at the end opposite the seat, a bolt stationarily secured in position, a coil spring about the bolt, the tension arm being provided with a depending end through which the bolt extends, the arrangement being such that as weight is applied to the seat the tension arm is moved to compress the coil spring.

4. A spring seat comprising a spring metal member bent upon itself to form compression and tension arms, a seat pivotally secured to said member at the return bend, the compression arm being stationarily secured in position at the end opposite the seat, the tension arm being movable upon weight being applied to the seat, yieldable means resisting movement of the tension arm and a plicate spring extending between the arms.

WALTER HOWARD.